United States Patent
Cheng et al.

(10) Patent No.: US 12,406,979 B2
(45) Date of Patent: Sep. 2, 2025

(54) CARBON-COATED LITHIUM-RICH OXIDE COMPOSITE MATERIAL AND PREPARATION METHOD THEREOF

(71) Applicant: HUBEI RT ADVANCED MATERIALS GROUP COMPANY LIMITED, Huangshi (CN)

(72) Inventors: Guangchun Cheng, Huangshi (CN); Jie Sun, Huangshi (CN); Zhonglin He, Huangshi (CN)

(73) Assignee: HUBEI RT ADVANCED MATERIALS GROUP COMPANY LIMITED, Huangshi (CN)

( * ) Notice: Subject to any disclaimer, the term of this patent is extended or adjusted under 35 U.S.C. 154(b) by 0 days.

(21) Appl. No.: 17/783,654

(22) PCT Filed: Jul. 24, 2020

(86) PCT No.: PCT/CN2020/104574
§ 371 (c)(1),
(2) Date: Jun. 9, 2022

(87) PCT Pub. No.: WO2022/007021
PCT Pub. Date: Jan. 13, 2022

(65) Prior Publication Data
US 2023/0121840 A1   Apr. 20, 2023

(30) Foreign Application Priority Data
Jul. 9, 2020   (CN) .......................... 202010657297.4

(51) Int. Cl.
H01M 4/04    (2006.01)
H01M 4/02    (2006.01)
(Continued)

(52) U.S. Cl.
CPC ......... *H01M 4/0471* (2013.01); *H01M 4/366* (2013.01); *H01M 4/485* (2013.01);
(Continued)

(58) Field of Classification Search
CPC ..... H01M 4/525; H01M 4/485; H01M 4/0471
See application file for complete search history.

(56) References Cited

U.S. PATENT DOCUMENTS

2022/0216471 A1*   7/2022   Zhou ................... H01M 4/5825

FOREIGN PATENT DOCUMENTS

| CN | 106601489 | 4/2017 |
|----|-----------|--------|
| CN | 107658138 Y | 2/2018 |

(Continued)

OTHER PUBLICATIONS

Zhang et al., "Mitigating the initial capacity loss and improving the cycling stability of silicon monoxide using Li.sub.5FeO.sub.4", 2018, Journal of Power Sources, vol. 400, pp. 540 to 555.*

Primary Examiner — Kelly M Gambetta
(74) Attorney, Agent, or Firm — Hemisphere Law, PLLC; Zhigang Ma

(57) ABSTRACT

The present disclosure relates to the technical field of positive electrode lithium-supplementing additives of the lithium battery, and discloses a carbon-coated lithium-rich oxide composite material and a preparation method thereof. The method comprises the following steps: (1) mixing an iron source or a cobalt source with a lithium source, and sintering to obtain a lithium-rich oxide $Li_5FeO_4$ or $Li_6CoO_4$; wherein, a molar ratio of the lithium source to the iron source is 5-25:1, and a molar ratio of the lithium source to the cobalt source is 6-30:1; (2) crushing the lithium-rich oxide obtained in the step (1); and (3) mixing the lithium-rich oxide crushed in the step (2) with a carbon source, and sintering to obtain the carbon-coated lithium-rich oxide (Continued)

composite material. The carbon-coated lithium-rich oxide composite material prepared by the method of the present disclosure overcomes the insufficient conductivity of lithium-rich materials, and has good electrochemical properties, which is capable of effectively compensating for active lithium lost during the initial charge-discharge process of the lithium battery.

8 Claims, 3 Drawing Sheets

(51) Int. Cl.
    *H01M 4/36*     (2006.01)
    *H01M 4/485*    (2010.01)
    *H01M 4/525*    (2010.01)

(52) U.S. Cl.
    CPC ...... *H01M 4/525* (2013.01); *H01M 2004/021* (2013.01); *H01M 2004/028* (2013.01)

(56) References Cited

FOREIGN PATENT DOCUMENTS

| | | | |
|---|---|---|---|
| CN | 107731560 Y | 2/2018 | |
| CN | 108878849 | 11/2018 | |
| CN | 110197887 Y | 9/2019 | |
| CN | 110498449 | 11/2019 | |
| CN | 111146412 A | * 5/2020 | |
| CN | 111146412 Y | 5/2020 | |
| JP | 2019085314 | 6/2019 | |
| JP | 2019085315 | 6/2019 | |
| JP | 2019085315 A | * 6/2019 | ............ C01G 49/00 |
| WO | 2019194613 Y | 10/2019 | |

* cited by examiner

CARBON-COATED LITHIUM-RICH OXIDE COMPOSITE MATERIAL AND PREPARATION METHOD THEREOF

CROSS REFERENCE TO RELATED APPLICATION

This patent application claims the benefit and priority of Chinese Patent Application No. 202010657297.4 filed on 9 Jul. 2020, the disclosure of which is incorporated by reference herein in its entirety as part of the present application.

TECHNICAL FIELD

The present disclosure relates to the technical field of positive electrode lithium-supplementing additives of the lithium battery, and specifically relates to a carbon-coated lithium-rich oxide composite material and a preparation method thereof.

BACKGROUND

Lithium-ion battery has high energy density and long cycle life, which is widely used in the fields such as consumer electronics, power batteries, and energy storage. However, during the initial charge-discharge process of lithium battery, part of the electrolyte would undergo the reduction reaction on the surface of negative electrode to form a dense solid-state electrolyte interface layer, which consumes the active lithium in the positive electrode active material to lead to irreversible capacity loss. In addition, part of the positive electrode material would also undergo the irreversible reaction during the initial charge-discharge process to reduce the active lithium content in the lithium battery, which would reduce the energy density of the lithium-ion battery.

Adopting the lithium supplementation method to compensate for the irreversible capacity loss of the lithium-ion battery may recover the capacity of the positive electrode material, and improve the energy density of the lithium-ion battery, thereby attracting the attention of the staff. The existing lithium supplementation technologies mainly include "adding the lithium powder to the surface of the negative electrode sheet", "spraying or dropping the organic lithium solution on the surface of the negative electrode sheet", "electrochemical method" and other pre-lithiation methods. However, the above methods have high environmental requirements and certain risks, and improper operation is prone to accidents.

By adding a small amount of the lithium-rich oxide to the positive electrode material, the lithium supplementation of the positive electrode can be realized based on the existing production process, and the energy density of the battery can be improved. Anti-fluorite structures $Li_5FeO_4$ and $Li_6CoO_4$ have broad application prospects in the lithium supplementation technologies due to their ultra-high specific capacity and irreversibility.

SUMMARY

To overcome the shortcomings in the prior art that the lithium supplementation methods have high environmental requirements and certain risks, the present disclosure provides a carbon-coated lithium-rich oxide composite material and a preparation method thereof. The method is capable of directly preparing the carbon-coated lithium-rich oxide composite material on the existing production line of the positive electrode material, which is scalable and economic. The insufficient conductivity of the lithium-rich oxide is overcome by the carbon-coated layer, so that the lithium-rich oxide is capable of providing sufficient active lithium for the positive electrode material to improve the energy density of the lithium battery.

To achieve the above-mentioned objects, one aspect of the present disclosure provides the method for preparing the carbon-coated lithium-rich oxide composite material, comprising the following steps:

(1) mixing an iron source or a cobalt source with a lithium source, and sintering to obtain a lithium-rich oxide $Li_5FeO_4$ or $Li_6CoO_4$; wherein, a molar ratio of the lithium source to the iron source is 5-25:1, and a molar ratio of the lithium source to the cobalt source is 6-30:1;

(2) crushing the lithium-rich oxide obtained in the step (1); and (3) mixing the lithium-rich oxide crushed in the step (2) with a carbon source, and sintering to obtain the carbon-coated lithium-rich oxide composite material.

Preferably, in the step (1), the iron source is one or more of iron(III) oxide, iron(II,III) oxide, ferric oxyhydroxide, ferric nitrate and ferric citrate.

Preferably, in the step (1), the cobalt source is one or more of cobalt(II) oxide, cobalt(II,III) oxide, cobalt carbonate, cobalt sulfate, cobalt chloride and cobalt nitrate.

Preferably, in the step (1), the lithium source is one or more of lithium carbonate, lithium hydroxide monohydrate, lithium hydroxide anhydrous and lithium oxide.

Preferably, in the step (1), the sintering process comprises putting the mixture of the iron source or the cobalt source and the lithium source in a sintering furnace, and heating to a first sintering temperature at a first preset heating rate for first sintering at an inert gas atmosphere.

Preferably, the first preset heating rate is 1-10° C./min.

Preferably, the first sintering temperature is 500-1000° C., and the first sintering time is 3-60 h.

Preferably, in the step (2), an average particle size of the lithium-rich oxide crushed is 2-50 μm.

Preferably, in the step (3), the carbon source is one or more of conductive carbon black, Ketjen black, carbon nanotube, acetylene black, vapor-grown carbon fiber, graphene and biomass carbon.

Preferably, in the step (3), based on the total weight of the lithium-rich oxide and the carbon source, the carbon source is 0.5-10 wt %.

Preferably, in the step (3), the sintering process comprises mixing the lithium-rich oxide crushed with the carbon source uniformly, and then heating to a second sintering temperature at a second preset heating rate for second sintering at the inert gas atmosphere.

Preferably, the second preset heating rate is 1-10° C./min.

Preferably, the second sintering temperature is 200-600° C., and the second sintering time is 2-20 h.

Another aspect of the present disclosure provides the carbon-coated lithium-rich oxide composite material prepared by the above-mentioned method, the carbon-coated lithium-rich oxide composite material comprises a carbon layer and a lithium-rich oxide coated by the carbon layer. The lithium-rich oxide is $Li_5FeO_4$ or $Li_6CoO_4$.

The carbon-coated lithium-rich oxide composite material prepared by the method of the present disclosure overcomes the insufficient conductivity of the lithium-rich materials, and has good electrochemical properties, which is capable of

DETAILED DESCRIPTION OF THE EMBODIMENTS

Figure 1:
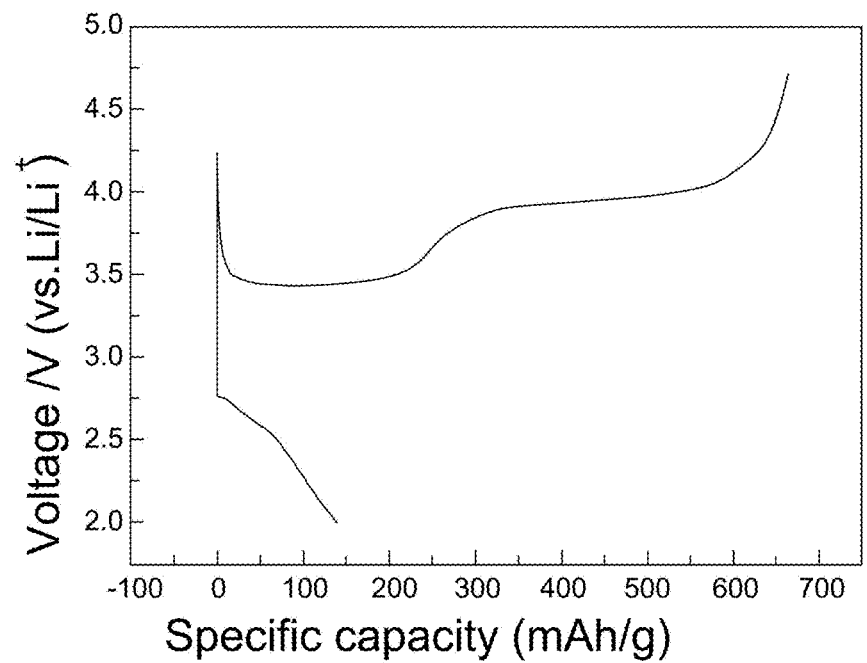
FIG. 1 is a scanning electron microscope image of a carbon-coated $Li_5FeO_4$ composite material prepared in Example 1 of the present disclosure.

The specific examples of the present disclosure will be described in detail below with reference to the accompanying drawings. It shall be understood that the specific examples described herein are illustrative only and not intended to limit the present disclosure.

The endpoints of the ranges and any values disclosed herein are not limited to the precise range or value, which are to be understood to include values approximating these ranges or values. In terms of the numerical ranges, one or more new numerical ranges may be acquired by combining endpoint values of each range, or by combining the endpoint value of each range and an individual point value, or by combining the individual point values, and these numerical ranges shall be considered as specifically disclosed herein.

One aspect of the present disclosure provides the method for preparing the carbon-coated lithium-rich oxide composite material, including the following steps:

(1) The iron source or the cobalt source is mixed with the lithium source to sinter, to obtain the lithium-rich oxide $Li_5FeO_4$ or $Li_6CoO_4$. The molar ratio of the lithium source to the iron source is 5-25:1, and the molar ratio of the lithium source to the cobalt source is 6-30:1.

(2) The lithium-rich oxide obtained in the step (1) is crushed.

(3) The lithium-rich oxide crushed in the step (2) is mixed with the carbon source to sinter, to obtain the carbon-coated lithium-rich oxide composite material.

The lithium-rich oxide in the carbon-coated lithium-rich oxide composite material prepared by the method of the present disclosure has good crystallinity, no impure phase, and good electrochemical properties. The carbon-coated layer is capable of improving the stability and conductivity of the lithium-rich oxide, which is beneficial to its performance.

In the method of the present disclosure, in the step (1), the iron source may be the conventional option in the art. Specifically, the iron source is one or more of iron(III) oxide, iron(II,III) oxide, ferric oxyhydroxide, ferric nitrate and ferric citrate. Preferably, the iron source is iron(III) oxide.

In the method of the present disclosure, in the step (1), the cobalt source may be the conventional option in the art. Specifically, the cobalt source is one or more of cobalt(II) oxide, cobalt(II,III) oxide, cobalt carbonate, cobalt sulfate, cobalt chloride and cobalt nitrate. Preferably, the cobalt source is cobalt(II) oxide.

In the method of the present disclosure, in the step (1), the lithium source may be the conventional option in the art. Specifically, the lithium source is one or more of lithium carbonate, lithium hydroxide monohydrate, lithium hydroxide anhydrous and lithium oxide. Preferably, the lithium source is lithium oxide.

To ensure that the mixture of the iron source or the cobalt source and the lithium source is sintered into the lithium-rich oxide with high crystallinity, the molar ratio of the lithium source to the iron source or the cobalt source is required to be controlled within an appropriate range.

In the specific example, the molar ratio of the lithium source to the iron source may be 5:1, 7:1, 9:1, 11:1, 13:1, 15:1, 17:1, 19:1, 21:1, 23:1, 25:1, and any value in the range formed by any two of the above-mentioned point values. In the preferred example, the molar ratio of the lithium source to the iron source is 5.5:1.

In the specific example, the molar ratio of the lithium source to the cobalt source may be 6: 1, 8:1, 10:1, 12:1, 14:1, 16:1, 18:1, 20:1, 22:1, 24:1, 26:1, 28:1, 30:1, and any value in the range formed by any two of the above-mentioned point values. In the preferred example, the molar ratio of the lithium source to the cobalt source is 6.6:1.

In the method of the present disclosure, in the step (1), the sintering process includes putting the mixture of the iron source or the cobalt source and the lithium source in the sintering furnace, and heating to the first sintering temperature at the first preset heating rate for the first sintering at the inert gas atmosphere.

In the sintering process of the step (1), the sintering furnace may be the conventional option in the art. Preferably, the sintering furnace is oven-type furnace.

In the sintering process of the step (1), the first preset heating rate is 1-10° C./min. Specifically, the first preset heating rate may be 1° C./min, 2° C./min, 3° C./min, 4° C./min, 5° C./min, 6° C./min, 7° C./min, 8° C./min, 9° C./min or 10° C./min. Preferably, the first preset heating rate is 2° C./mm.

In the sintering process of the step (1), the first sintering temperature is 500-1000° C. Specifically, the first sintering temperature may be 500° C., 550° C., 600° C., 700° C., 750° C., 800° C., 850° C., 900° C., 950° C. or 1000° C.

When the lithium-rich oxide obtained by sintering is $Li_5FeO_4$, the first sintering temperature is preferably 850° C.

When the lithium-rich oxide obtained by sintering is $Li_5CoO_4$, the first sintering temperature is preferably 700° C.

In the sintering process of the step (1), the first sintering time is 3-60 h. Specifically, the first sintering time may be 3 h, 5 h, 8 h, 10 h, 13 h, 16 h, 20 h, 23 h, 25 h, 30 h, 35 h, 40 h, 43 h, 48 h, 52 h, 55 h, 57 h, 60 h, and any value in the range formed by any two of the above-mentioned point values.

When the lithium-rich oxide obtained by sintering is $Li_5FeO_4$, the first sintering time is preferably 10-40 h, and more preferably 12-30 h.

When the lithium-rich oxide obtained by sintering is $Li_5CoO_4$, the first sintering time is preferably 5-30 h, and more preferably 6-24 h.

In the method of the present disclosure, in the step (2), the average particle size of the lithium-rich oxide crushed is 2-50 μm. Specifically, the average particle size of the lithium-rich oxide crushed may be 2 μm, 5 μm, 10 μm, 15 μm, 20 μm, 25 μm, 30 μm, 35 μm, 40 μm, 45 μm, 50 μm, and any value in the range formed by any two of the above-mentioned point values. Preferably, in the step (2), the average particle size of the lithium-rich oxide crushed is 25 μm.

In the method of the present disclosure, in the step (3), the carbon source may be a conductive carbon material conventionally used in the art. Specifically, the carbon source may be one or more of conductive carbon black, Ketjen black, carbon nanotube, acetylene black, vapor-grown carbon fiber, graphene and biomass carbon. The carbon source is preferably conductive carbon black, and more preferably conductive carbon black Super P.

In the method of the present disclosure, in the step (3), based on the total weight of the lithium-rich oxide and the carbon source, the carbon source is 0.5-10 wt %. Specifically, the carbon source may be 0.5 wt %, 1 wt %, 2 wt %, 4 wt %, 6 wt %, 8 wt %, 10 wt %, and any value in the range formed by any two of the above-mentioned point values. Preferably, in the step (3), based on the total weight of the lithium-rich oxide and the carbon source, the carbon source is 1 wt %

In the method of the present disclosure, in the step (3), the sintering process includes mixing the lithium-rich oxide crushed with the carbon source uniformly, and then heating to the second sintering temperature at the second preset heating rate for the second sintering at the inert gas atmosphere.

In the sintering process of the step (3), the sintering furnace may be the conventional option in the art. Preferably, the sintering furnace is oven-type furnace.

In the sintering process of the step (3), the second preset heating rate is 1-10° C./min. Specifically, the second preset heating rate may be 1° C./min, 2° C./min, 3° C./min, 4° C./min, 5° C./min, 6° C./min, 7° C./min, 8° C./min, 9° C./min or 10° C./min. Preferably, the second preset heating rate is 5° C./min.

In the sintering process of the step (3), the second sintering temperature is 200-600° C. Specifically, the second sintering temperature may be 200° C., 300° C., 400° C., 500° C., 600° C., and any value in the range formed by any two of the above-mentioned point values. Preferably, the second sintering temperature is 450° C.

In the sintering process of the step (3), the second sintering time is 2-20 h. Specifically, the second sintering time may be 2 h, 5 h, 8 h, 10 h, 13 h, 15 h, 17 h, 20 h, and any value in the range formed by any two of the above-mentioned point values. Preferably, the second sintering time is 4-10 h.

Another aspect of the present disclosure provides the carbon-coated lithium-rich oxide composite material prepared by the above-mentioned method. The carbon-coated lithium-rich oxide composite material includes a carbon layer and a lithium-rich oxide coated by the carbon layer. The lithium-rich oxide is anti-fluorite structures $Li_5FeO_4$ or $Li_6CoO_4$. The carbon-coated lithium-rich oxide composite material may be used as the additives to provide the irreversible lithium consumed in the initial charge-discharge process of the positive electrode material.

The present disclosure will be described in detail by the following examples which are not intended to limit the protection scope of the present disclosure.

Examples 1-3 of the present disclosure are used to illustrate the preparation process of the carbon-coated $Li_5FeO_4$ composite material. Examples 4-6 of the present disclosure are used to illustrate the preparation process of the carbon-coated $Li_6CoO_4$ composite material.

Example 1

Figure 3:
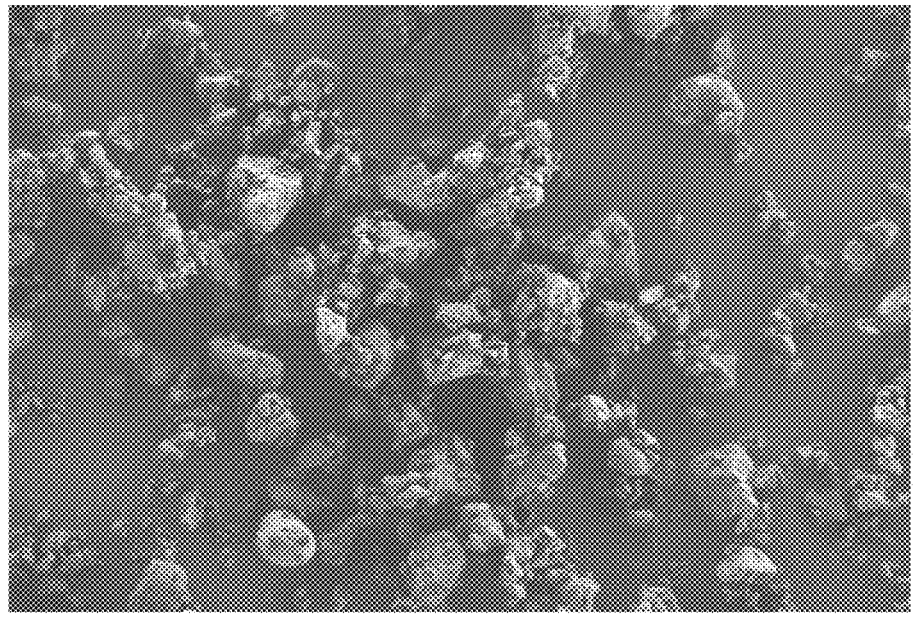
FIG. 3 is a charge-discharge curve of the carbon-coated $Li_5FeO_4$ composite material prepared in Example 1 of the present disclosure.

206.2 g of $Li_2O$ and 200 g of $Fe_2O_3$ are mixed uniformly to obtain the mixture, and then the mixture is put into the oven-type furnace to heat up to 850° C. at the heating rate of 2° C./min and sinter for 24 h at the inert gas atmosphere. $Li_5FeO_4$ obtained by sintering is crushed until the average particle size is 35 μm, and then evenly mixed with the conductive carbon black Super P to obtain the mixture. The mixture is put into the oven-type furnace to heat up to 450° C. at the heating rate of 5° C./min and insulate for 7 h at the inert gas atmosphere, to obtain the carbon-coated $Li_5FeO_4$ composite material (the scanning electron microscope image and the charge-discharge curve are shown as FIG. 1 and FIG. 3). The conductive carbon black Super P accounts for 3 wt % of the total weight of the composite material.

Example 2

283.8 g of $Li_2OH \cdot H_2O$ and 100 g of $Fe_2O_3$ are mixed uniformly to obtain the mixture, and then the mixture is put into the oven-type furnace to heat up to 950° C. at the heating rate of 5° C./min and sinter for 36 h at the inert gas atmosphere. $Li_5FeO_4$ obtained by sintering is crushed until the average particle size is 15 μm, and then evenly mixed with the Ketjen black to obtain the mixture. The mixture is put into the oven-type furnace to heat up to 600° C. at the heating rate of 10° C./min and insulate for 18 h at the inert gas atmosphere, to obtain the carbon-coated $Li_5FeO_4$ composite material. The Ketjen black accounts for 2 wt % of the total weight of the composite material.

Example 3

109.1 g of $Li_2O$ and 100 g of $Fe_2O_3$ are mixed uniformly to obtain the mixture, and then the mixture is put into the oven-type furnace to heat up to 750° C. at the heating rate of 8° C./min and sinter for 40 h at the inert gas atmosphere. $Li_5FeO_4$ obtained by sintering is crushed until the average particle size is 50 μm, and then evenly mixed with the conductive carbon black Super P to obtain the mixture. The mixture is put into the oven-type furnace to heat up to 300° C. at the heating rate of 2° C./min and insulate for 4 h at the inert gas atmosphere, to obtain the carbon-coated $Li_5FeO_4$ composite material. The conductive carbon black Super P accounts for 5 wt % of the total weight of the composite material.

Comparative Example 1

The $Li_5FeO_4$ material is prepared according to the method of Example 1, and the difference is that $Li_5FeO_4$ crushed is not carbon-coated.

Example 4

Figure 2:
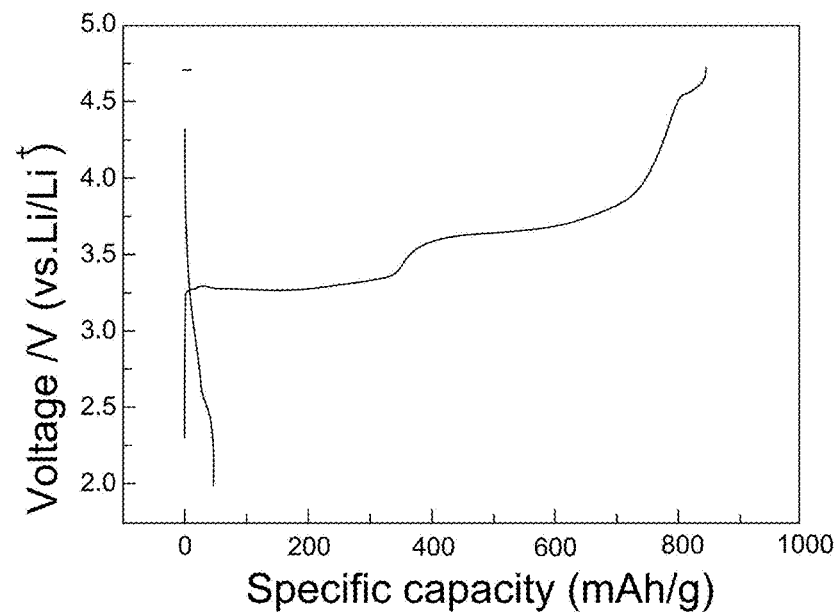
FIG. 2 is a scanning electron microscope image of a carbon-coated $Li_6CoO_4$ composite material prepared in Example 4 of the present disclosure.
Figure 4:
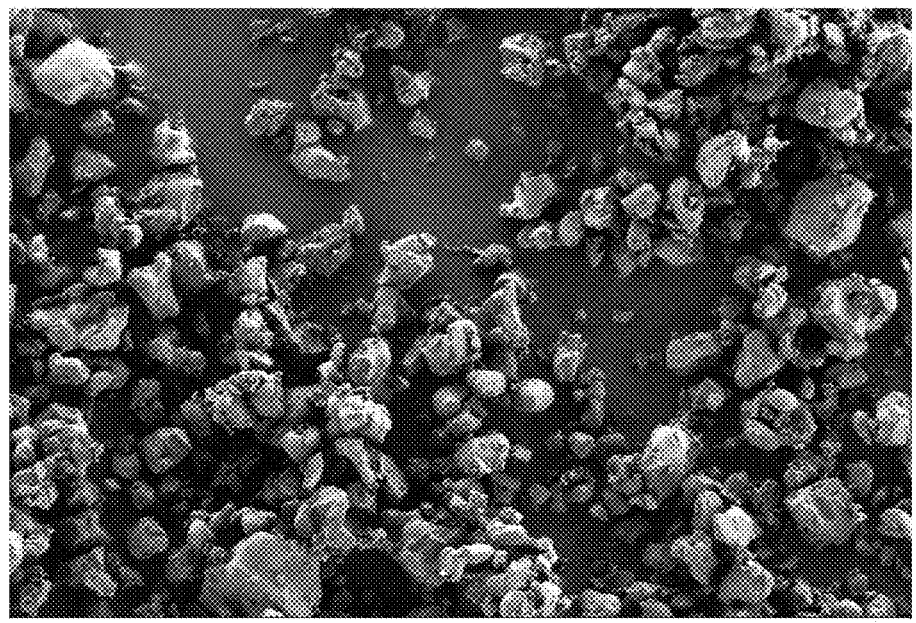
FIG. 4 is a charge-discharge curve of the carbon-coated $Li_6CoO_4$ composite material prepared in Example 4 of the present disclosure.

130.67 g of $Li_2O$ and 100 g of CoO are mixed uniformly to obtain the mixture, and then the mixture is put into the oven-type furnace to heat up to 700° C. at the heating rate of 2° C./min and sinter for 18 h at the inert gas atmosphere. $Li_6CoO_4$ obtained by sintering is crushed until the average particle size is 10 μm, and then evenly mixed with the conductive carbon black Super P to obtain the mixture. The mixture is put into the oven-type furnace to heat up to 450° C. at the heating rate of 8° C./min and insulate for 10 h at the inert gas atmosphere, to obtain the carbon-coated $Li_6CoO_4$ composite material (the scanning electron microscope image and the charge-discharge curve are shown as FIG. 2 and FIG. 4). The conductive carbon black Super P accounts for 3 wt % of the total weight of the composite material.

Example 5

87.3 g of $Li_2O$ and 100 g of $CoCO_3$ are mixed uniformly to obtain the mixture, and then the mixture is put into the oven-type furnace to heat up to 800° C. at the heating rate of 6° C./min and sinter for 12 h at the inert gas atmosphere. $Li_6CoO_4$ obtained by sintering is crushed until the average particle size is 30 μm, and then evenly mixed with the carbon nanotube to obtain the mixture. The mixture is put into the oven-type furnace to heat up to 350° C. at the heating rate of 4° C./min and insulate for 5 h at the inert gas atmosphere, to obtain the carbon-coated $Li_6CoO_4$ composite material. The carbon nanotube accounts for 1 wt % of the total weight of the composite material.

Example 6

205.64 g of LiOH and 100 g of CoO are mixed uniformly to obtain the mixture, and then the mixture is put into the oven-type furnace to heat up to 750° C. at the heating rate of 9° C./min and sinter for 15 h at the inert gas atmosphere. $Li_6CoO_4$ obtained by sintering is crushed until the average particle size is 5 μm, and then evenly mixed with the conductive carbon black KS-6 to obtain the mixture. The mixture is put into the oven-type furnace to heat up to 300° C. at the heating rate of 7° C./min and insulate for 15 h at the inert gas atmosphere, to obtain the carbon-coated $Li_6CoO_4$ composite material. The conductive carbon black KS-6 accounts for 2 wt % of the total weight of the composite material.

Comparative Example 1

The $Li_6CoO_4$ material is prepared according to the method of Example 4, and the difference is that $Li_6CoO_4$ crushed is not carbon-coated.

Testing Example

The materials prepared in Examples 1-6 and Comparative Examples 1-2 are prepared into the lithium-ion battery to test. The testing steps are as follows: The carbon-coated $Li_5FeO_4$, Super P and PVDF are dispersed in NMP at the mass ratio of 90:5:5, and the solid content is controlled to be about 40%. Then, the mixture obtained is coated on the aluminum foil after being evenly dispersed by the defoamer, and dried in vacuum to prepare the positive electrode sheet. The positive electrode sheet is assembled into the coin battery 2025 in the glove box, and the electrolyte is 1.2 mol/L $LiPF_6$ in EC:EMC at the volume ratio of 3:7. The separator is Celgard polypropylene film, and the lithium sheet is used as the counter electrode. The capacity of the assembled half battery is tested by Neware tester. The charge cut-off voltage is 4.7 V, the discharge cut-off voltage is 2.0 V, and the charge-discharge rate is 0.05 C. The test results are shown in Table 1 and Table 2.

TABLE 1

Test results of the carbon-coated $Li_5FeO_4$ composite material

| Serial No. of Example | First charge specific capacity (mAh/g) |
| --- | --- |
| Example 1 | 672.73 |
| Example 2 | 605.48 |
| Example 3 | 622.95 |
| Comparative Example 1 | 551.32 |

It can be seen from the data in Table 1 that the carbon-coated $Li_5FeO_4$ composite materials prepared in Examples 1-3 have a significantly higher first charge specific capacity, indicating that the carbon-coated lithium-rich oxide composite material prepared by the method of the present disclosure has significantly improved electrochemical properties.

TABLE 2

Test results of the carbon-coated $Li_6CoO_4$ composite material

| Serial No. of Example | First charge specific capacity (mAh/g) |
| --- | --- |
| Example 4 | 851.15 |
| Example 5 | 799.77 |
| Example 6 | 847.82 |
| Comparative Example 2 | 769.92 |

It can be seen from the data in Table 2 that the carbon-coated $Li_6CoO_4$ composite materials prepared in Examples 4-6 have a significantly higher first charge specific capacity, indicating that the carbon-coated lithium-rich oxide composite material prepared by the method of the present disclosure has significantly improved electrochemical properties.

The preferred examples of the present disclosure have been described above in detail. However, the present disclosure is not limited thereto. Within the scope of the technical concept of the present disclosure, various simple modifications, including combining various technical features in any other suitable manner, may be made to the technical solutions of the present disclosure, which shall be regarded as the content disclosed in the present disclosure and fall within the protection scope of the present disclosure.

What is claimed is:

1. A method for preparing a carbon-coated lithium-rich oxide composite material, wherein, comprising the following steps:
    (1) mixing an iron source or a cobalt source with a lithium source to obtain a mixture, and performing a first sintering to obtain a lithium-rich oxide $Li_5FeO_4$ or $Li_6CoO_4$; wherein, a molar ratio of the lithium source to the iron source is 5-25:1, and a molar ratio of the lithium source to the cobalt source is 6-30:1;
    (2) crushing the lithium-rich oxide obtained in the step (1); and
    (3) mixing the lithium-rich oxide crushed in the step (2) with a carbon source, and performing a second sintering to obtain the carbon-coated lithium-rich oxide composite material, wherein the carbon source is one or more of conductive carbon black, Ketjen black, carbon nanotube, acetylene black, vapor-grown carbon fiber, graphene and biomass carbon;
    wherein, in the step (3), the second sintering comprises heating to a second sintering temperature at a second preset heating rate at the inert gas atmosphere; wherein, the second preset heating rate is 1-10° C./min; and the second sintering temperature is 200-600° C.

2. The method according to claim 1, wherein, in the step (1), the iron source is one or more of iron (III) oxide, iron (II,III) oxide, ferric oxyhydroxide, ferric nitrate and ferric citrate.

3. The method according to claim 1, wherein, in the step (1), the cobalt source is one or more of cobalt (II) oxide, cobalt (II,III) oxide, cobalt carbonate, cobalt sulfate, cobalt chloride and cobalt nitrate.

4. The method according to claim 1, wherein, in the step (1), the lithium source is one or more of lithium carbonate, lithium hydroxide monohydrate, lithium hydroxide anhydrous and lithium oxide.

5. The method according to claim 1, wherein, in the step (1), the first sintering comprises putting the mixture of the iron source or the cobalt source and the lithium source in a sintering furnace, and heating to a first sintering temperature at a first preset heating rate at an inert gas atmosphere; wherein, the first preset heating rate is 1-10° C./min;

the first sintering temperature is 500-1000° C., and a first sintering time for the first sintering is 3-60 h.

6. The method according to claim 1, wherein, in the step (2), an average particle size of the lithium-rich oxide crushed is 2-50 μm.

7. The method according to claim 1, wherein, in the step (3), based on the total weight of the lithium-rich oxide and the carbon source, the carbon source is 0.5-10 wt %.

8. The method according to claim 1, wherein, in the step (3), a second sintering time for the second sintering is 2-20 h.

* * * * *